(12) United States Patent
Stocker et al.

(10) Patent No.: US 10,565,022 B2
(45) Date of Patent: Feb. 18, 2020

(54) SYSTEMS FOR PARALLEL PROCESSING OF DATASETS WITH DYNAMIC SKEW COMPENSATION

(71) Applicant: CAPITAL ONE SERVICES, LLC, McLean, VA (US)

(72) Inventors: John Stocker, Alexandria, VA (US); Sunny Kumar, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/027,772

(22) Filed: Jul. 5, 2018

(65) Prior Publication Data

US 2018/0314566 A1 Nov. 1, 2018

Related U.S. Application Data

(63) Continuation of application No. 15/271,937, filed on Sep. 21, 2016.

(60) Provisional application No. 62/221,434, filed on Sep. 21, 2015.

(51) Int. Cl.
*G06F 9/50* (2006.01)

(52) U.S. Cl.
CPC .......... *G06F 9/5066* (2013.01); *G06F 9/5083* (2013.01)

(58) Field of Classification Search
CPC ................................................ G06F 17/30584
See application file for complete search history.

(56) References Cited

U.S. PATENT DOCUMENTS

| 2009/0287672 A1* | 11/2009 | Chakrabarti | ...... G06F 17/30864 |
| 2013/0204990 A1* | 8/2013 | Skjolsvold | ............ G06F 9/5077 |
| | | | 709/223 |
| 2013/0332931 A1* | 12/2013 | Malewicz | ................. G06F 7/38 |
| | | | 718/102 |

(Continued)

OTHER PUBLICATIONS

LIBRA: Lightweight Data Skew Mitigation in MapReduce Qi Chen, Jinyu Yao, and Zhen Xiao Originally Published:Aug. 21, 2014; current version: Aug. 7, 2015 (Year: 2014).*

(Continued)

*Primary Examiner* — Emerson C Puente
*Assistant Examiner* — Paul V Mills
(74) *Attorney, Agent, or Firm* — Finnegan, Henderson, Farabow, Garrett & Dunner LLP

(57) ABSTRACT

Systems and methods are provided for parallel processing of datasets with dynamic skew compensation. The disclosed systems and methods may increase the efficiency of dataset processing by imposing maximum size limits on parallel processing environment tasks. The disclosed systems and methods may generate a target partition of a variable, a database storing data elements, a cluster that generates one or more output files based on the target partition and the data elements, and a display device that displays analysis results for the target partition using the one or more output files. Generation may comprise creating a calculation partition, mapping data elements according to the calculation partition, and generating the one or more output files based on the mapped data elements. The calculation partition may depend on a target partition and a uniform partition that partitions values based on one or more statistical measures and pseudorandom functions.

20 Claims, 8 Drawing Sheets

(56) References Cited

U.S. PATENT DOCUMENTS

| | | | | |
|---|---|---|---|---|
| 2014/0033223 A1* | 1/2014 | Swart | ................... | G06F 9/5066 |
| | | | | 718/105 |
| 2016/0092493 A1* | 3/2016 | Ko | ................... | G06F 17/30445 |
| | | | | 707/693 |

OTHER PUBLICATIONS

Data Cube Materialization and Mining over MapReduce Arnab Nandi, Cong Yu, Philip Bohannon, and Raghu Ramakrishnan (Year: 2012).*

Solutions for Processing K Nearest Neighbor Joins for Massive Data on MapReduce Ge Song, Justin Rochas, Fabrice Huet and Frederic Magoules (Year: 2015).*

Non-Final Rejection for U.S. Appl. No. 15/271,937 dated May 22, 2018.*

Apache Pig's Optimizer Alan F. Gates, Jianyong Dai, Thejas Nair (Year: 2013).*

Balancing Reducer Skew in MapReduce Workloads using Progressive Sampling Smriti R Ramakrishnan, Garret Swart, Aleksey Urmanov (Year: 2012).*

Balancing reducer workload for skewed data using sampling based partitioning Yujie Xu, Wenyu Qua, Zhiyang Li, Zhaobin Liu, Changqing Ji, Yuanyuan Li, Haifeng Li (Year: 2013).*

Handing Data Skew in MapReduce Benjamin Gufler, Nikolaus Augsten, Angelika Reiser and Alfons Kemper (Year: 2011).*

Sampling-based Partitioning in MapReduce for Skewed Data Yujie Xu, Peng Zou, Wenyu Qu, Zhiyang Li, Keqiu Li and Xiaoli Cui (Year: 2012).*

Alsabti, K. et al., "A One-Pass Algorithm for Accurately Estimating Quantiles for Disk-Resident Data," Surface, College of Engineering and Computer Science, Syracuse University, 1997.

Cormode, G. et al., "Effective Computation of Biased Quantiles over Data Streams," Proceedings of the 21st International Conference on Data Engineering (ICDE 2005).

Harrell, F.E. et al., "A New Distribution-Free Quantile Estimator," Biometrika (1982), vol. 69, No. 3, pp. 635-640.

Hosseini, R. et al., "Approximating Quantiles in Very Large Datasets," arXiv:1007.1032v1, submitted on Jul. 7, 2010.

Hyndman, R.J. et al., "Sample Quantiles in Statistical Packages," The American Statistician, vol. 50, No. 4 (Nov. 1996), pp. 361-365.

Qi Chen, Jinyu Yao, and Zhen Xiao, "LIBRA: Lightweight Data Skew Mitigation in MapReduce," Originally Published: Aug. 21, 2014; current version: Aug. 7, 2015.

Arnab Nandi, Gong Yu, Philip Bohannon, and Raghu Ramakrishnan, "Data Cube Materialization and Mining over MapReduce", published 2012.

Ge Song, Justine Rochas, Fabrice Huet, and Frederic Magoules, "Solutions for Processing K Nearest Neighbor Joins for Massive Data on Map Reduce," Published: Mar. 2015.

Smriti R Ramakrishnan, Garret Swart, Aleksey Urmanov, "Balancing Reducer Skew in MapReduce Workloads using Progressive Sampling," Published: Oct. 17, 2012.

* cited by examiner

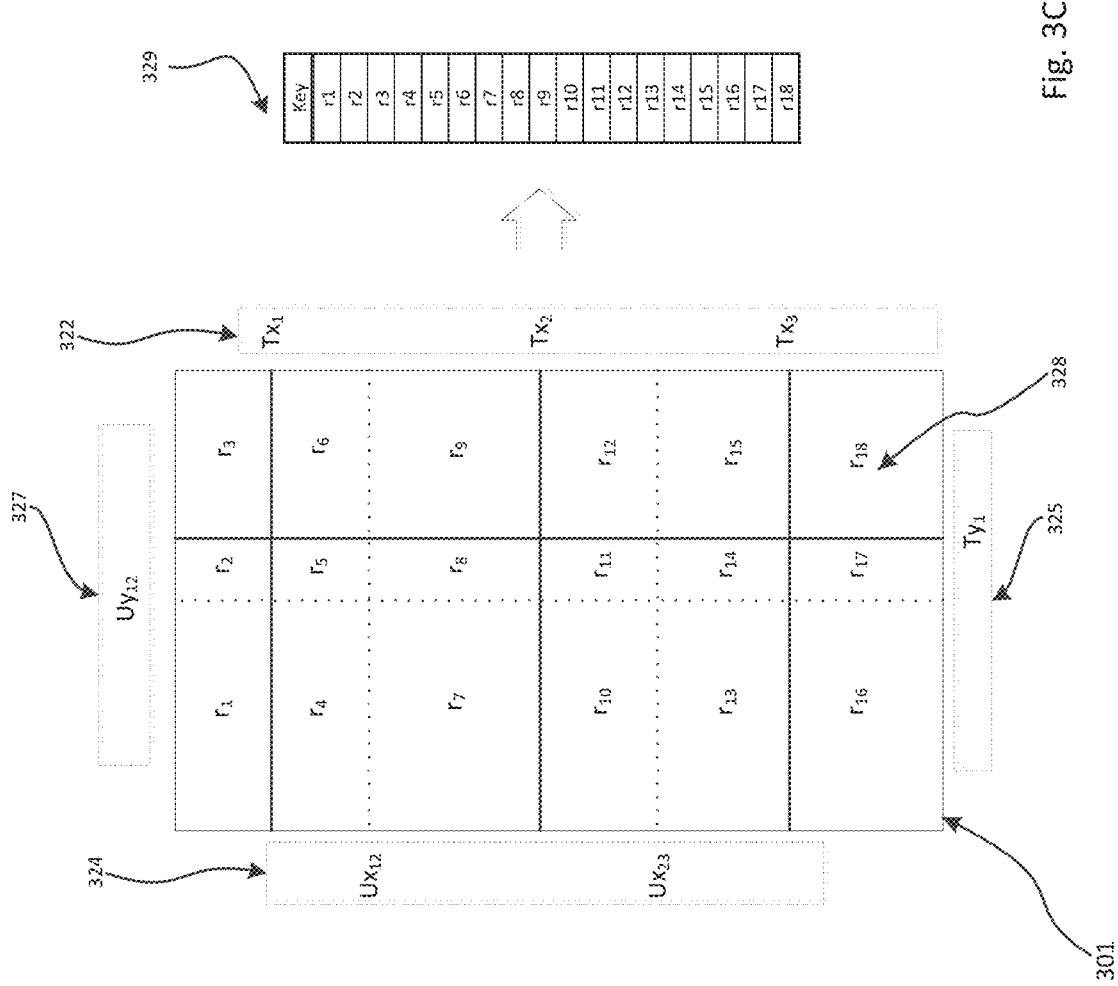

SYSTEMS FOR PARALLEL PROCESSING OF DATASETS WITH DYNAMIC SKEW COMPENSATION

RELATED APPLICATIONS

This application is a continuation of U.S. patent application Ser. No. 15/271,937, filed on Sep. 21, 2016, which claims priority from U.S. Provisional Patent Application No. 62/221,434, filed on Sep. 21, 2015. The entire contents of these disclosures are incorporated by references in the present application.

TECHNICAL FIELD

The disclosed systems provide parallel processing for data analysis. In particular, the disclosed systems disclose an improved dataset processing system with dynamic skew compensation. The disclosed systems solve problems related to minimizing processing execution time by, among other things, efficiently distributing the dataset processing among nodes in a cluster, and allocating resources.

BACKGROUND

The term "Big Data" typically refers to datasets too large for processing in a traditional manner on a single computer. Instead, the analysis of such datasets may require distributing tasks across multiple computing devices, or nodes. These nodes may then efficiently execute the distributed tasks in parallel. But a non-uniform distribution of tasks across nodes may dramatically reduce the efficiency of this approach. Such a non-uniform distribution of tasks may arise when processing data with a non-uniform (or skewed) distribution of values.

For example, a dataset of customer accounts may include a skewed distribution of customer ages, due to the difference in population between different generations. This skewed distribution may inhibit efficient analysis of this dataset. For example, when the customer accounts are grouped by customer age into decades, the resulting decade groups will contain unequal numbers of accounts. The time efficiency with which the analysis of the dataset according to this decade grouping could be accomplished would be adversely affected by the time required to analyze the largest group.

Existing methods may attempt to improve efficiency by monitoring nodes during execution of an analysis. These methods may rely on detecting and stopping long-running tasks. The stopped tasks may be divided into smaller tasks and redistributed among the nodes. While such monitoring may be performed automatically, such automatic methods are experimental, unstable, and difficult to apply to some calculations. Manual methods necessitate manually updating software instructions, and are therefore tedious, complicated, and error-prone. Other existing methods simply iterate trial analyses, updating task allocations until an efficient allocation is discovered. But the duration of each trial analysis may vary from minutes to hours, rending this approach unpredictable and inefficient. A need therefore exists for improved dynamic skew compensation for parallel processing of large datasets.

SUMMARY

The disclosed systems determine a uniform distribution of work in each task prior to execution, providing more efficient, predictable execution without the drawbacks of current methods that may identify long-running tasks only during or after execution. The disclosed systems do not necessitate manually updating software instructions, as in manual task subdivision. Nor do the disclosed systems risk system instability and job scheduler perturbations, as in dynamic task subdivision. As an additional benefit, the envisioned embodiments impose maximum task sizes, with associated maximum execution times, improving the accuracy and reliability of the job scheduler's management of the parallel computing environment during execution of the analysis.

The disclosed systems may determine a uniform partition of data elements (e.g., sensor measurements, log files, streaming data, database rows, records, objects, documents, or other data structures storing information) relevant to an analytic objective. As a non-limiting example, when the analytic object comprises determining financial account balances according to selected customer characteristics (e.g., demographic information, financial information, personal information, etc.), the disclosed systems may determine a uniform partition of data elements by the selected customer characteristics. This uniform partition may be based on statistical measures, such as quantiles. Computing these statistical measures may require processing of every element of the dataset, but this computation may require seconds to minutes. Accordingly, the efficiency gains from uniformly distributing tasks more than offset the expense of computing the statistical measures.

The disclosed systems may be configured to analyze a dataset according to a target partition. A target partition may group data elements according to numerical variable target ranges, categorical-valued variables, or categorical-valued variable groups. For example, a target partition may group data elements according to the numerical variable "age" into decades, or into more complicated groupings, such as age groups (e.g., customers younger than 18, 18-24, 25-34, 45-64, and customers over 64). As an additional example, a target partition may group data elements according the categorical variable "state of residence" into geographical regions (e.g., the regions "Northeast," "Southeast," "Midwest," "Central," "Northwest," and "Southwest").

The disclosed systems may determine a calculation partition based on the target partition and a uniform partition of the variable. The disclosed systems may determine a calculation partition for multiple target partitions. For instance, the disclosed systems may create a calculation partition for an analysis grouping financial services customers by both age ranges and credit risk score ranges. The disclosed systems may create a calculation partition grouping data elements across both numerical ranges and categorical variable values, or groups of values (e.g., "state of residence" or geographical region). In each case, the disclosed systems may aggregate data corresponding to subsets of the calculation partition to generate intermediate values. The disclosed systems may further aggregate these intermediate values into analysis results satisfying the analytic objective. As used herein, results may comprise scalar values, arrays, lists, dictionaries, records, objects, functions, or other datatypes known to one of skill in the art.

The disclosed systems may be implemented using a parallel computing environment, such as the MapReduce architecture described in "MapReduce: Simplified Data Processing on Large Clusters," by Jeffrey Dean and Sanjay Ghemawat, or the Spark architecture described in "Spark: Cluster Computing with Working Sets," by Matei Zaharia, Mosharaf Chowdhury, Michael J. Franklin, Scott Shenker, and Ion Stoica, each of which is incorporated herein by reference in its entirety. In such an architecture (e.g., Apache™ Hadoop® (see http://hadoop.apache.org/) or the like), the disclosed systems may comprise mappers and reducers. In the context of MapReduce, map functions perform simple computations and filtering operations on discrete elements of the input dataset. Typically, the input to a mapper is a series of key-value pairs, which are processed individually and result in an output of zero or more key-value pairs. Reduce functions perform a summary operation on the output directly or indirectly generated by mappers. One reducer works once for each unique key generated from the previous operation in the sorted order. For each key, reducers will iterate through all the values associated with each key and generate zero or more outputs. The disclosed system relies on the map and reduce, or similar, capabilities in the resident parallel computing environment and improves execution efficiency by configuring map and reduce, or similar, functions to evenly distribute work among the mappers and reducers.

The disclosed system may include calculation partitions that define the keys by which the mappers evenly group data elements for aggregation by the reducers. The reducers may then compute aggregate results for each group of mapped data elements. In some embodiments, the disclosed systems may create two phases of reducers. A first phase of reducers may determine intermediate values according to the calculation partition. A second phase of reducers may determine analysis results based on the intermediate values. In certain embodiments, another computing device may determine analysis results based on intermediate results provided by the parallel computing environment.

The disclosed systems are not limited to a specific parallelization technology, job scheduler (e.g., Apache™ Hadoop® YARN (Yet Another Resource Negotiator, see http://hadoop.apache.org/docs/current/hadoop-yarn/hadoop-yarn-site/YARN.html) or Apache™ Mesos (see http://mesos.apache.org/)), programming language, parallel computing environment, or parallel computing environment communications protocol. For example, the disclosed systems may be implemented in scientific computing clusters, databases, cloud-based computing environments, and ad-hoc parallel computing environments (e.g., SETI@home (see http://setiathome.berkeley.edu/) or the like).

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIGS. 3A-3C depict schematics illustrating exemplary calculation partitions.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
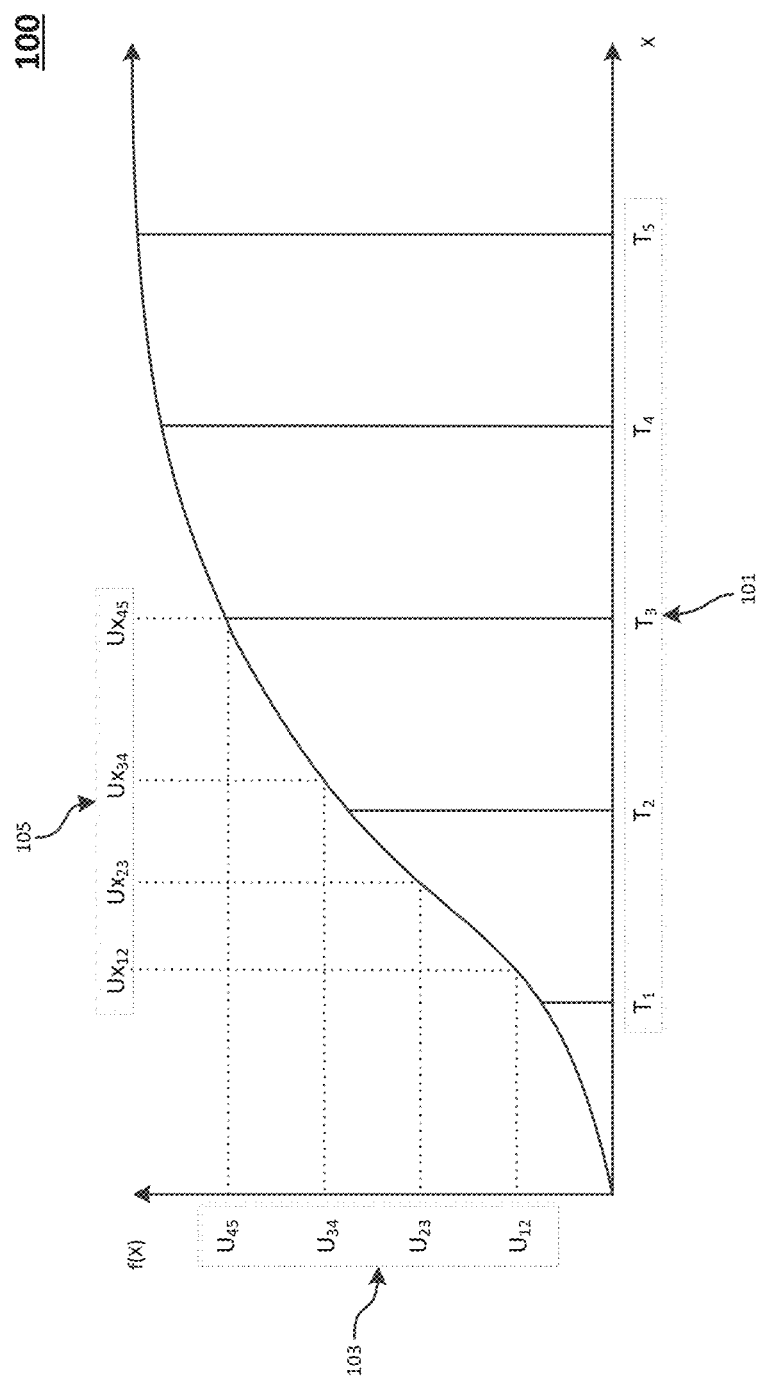
FIG. 1 depicts an exemplary skewed cumulative distribution function consistent with disclosed embodiments.

FIG. 1 depicts an exemplary skewed function 100 of a variable, consistent with disclosed embodiments. In some embodiments, the skewed function 100 may be a cumulative distribution function. Skewed function 100 describes a continuously valued numeric variable (such as a financial account balance), but one of skill in the art would recognize the applicability of the following disclosure to discrete-valued numeric variables (such as the age of an account holder in years). Consistent with disclosed embodiments, the disclosed systems may be configured to analyze data elements according to target partition 101. The number of data elements, however, may differ between subsets of target partition 101. In contrast, uniform partition 105 may divide the data elements into similarly sized groups, but these groups may not correspond to target ranges of target partition 101. As a non-limiting example, as shown in FIG. 1, target partition 101 defines six target ranges, while uniform partition 105 defines five different similarly sized groups of data elements.

The disclosed systems may be configured to determine a uniform partition 105 that divides data elements into similarly sized groups. As used herein, the number of data elements the similarly sized groups of uniform partition 105 may differ by less than 50%. As a non-limiting example, when the smallest group of uniform partition 105 comprises 100 data elements, the largest group of uniform partition 105 may comprise fewer than 150 data elements. As a further non-limiting example, the similarly sized groups of uniform partition 105 may differ may differ by less than 10%.

The disclosed systems may be configured to determine a uniform partition 105 based on statistical measures 103. The particular number of subsets in uniform partition 105 may depend on the skewness of the data (e.g., non-uniform distribution of certain values of the data) and the number of nodes available in the parallel processing environment. It is common for the number of data elements in a dataset to be skewed, or have a different count of values in each index or key that a reducer will need to operate on. For example, the number of null or 0 values may be quite high for a key that is defined by a specific field in a dataset, creating significant skew, and disproportionate work for the reducer associated with the null or 0 key. For clarity, FIG. 1 displays a small number of uniform partitions (5) and a small number of target partitions (6). One of skill in the art would appreciate that these numbers are not intended to be limiting. For example, a greater number of groups of data elements and of target ranges may be used in practice. Furthermore, one of skill in the art would appreciate that uniform partition 105 may include far more groups of data elements than target partition 101 includes target ranges.

Consistent with disclosed embodiments, statistical measures 103 may be a function of the values of the data elements. In some embodiments, statistical measures 103 may depend on a distribution function of the values of the data elements, such as, but not limited to, a probability distribution function, cumulative distribution function, or beta cumulative distribution function. In certain embodiments, statistical measures 103 may be quantiles or estimated quantiles. One of skill in the art would be familiar with systems and methods for determining both exact and estimated quantiles. As a non-limiting example, methods for estimating quantiles are disclosed in "A new distribution-free quantile Estimator" by Frank E. Harrell and C. E. Davis; "Sample Quantiles in Statistical Packages" by Hyndman and Fan; "Approximating quantiles in very large datasets," by Reza Hosseini; "A One-Pass Algorithm for Accurately Estimating Quantiles for Disk-Resident Data" by Khaled Alsabti, Sanjay Ranka, and Vineet Singh; and "Effective Computation of Biased Quantiles over Data Streams" by Graham Cormode, Flip Korn, S. Muthukrishnany, and Divesh Srivastava, each of which is incorporated herein by reference in its entirety. Furthermore, as would be recognized by one of skill in the art, the envisioned embodiments are not intended to be limited to particular methods of determining exact and estimated quantiles. As a non-limiting example, the quantiles or estimated quantiles may range from deciles to percentiles. For example, the quantiles or estimated quantiles may be twentiles.

As discussed in greater detail below, the disclosed systems may derive a calculation partition for one or more variables. This calculation partition may be used by the disclosed systems for processing data elements to generate results. In certain aspects, the calculation partition may comprise partitions for each of the variables. In some embodiments, these partitions may be functions of a target partition (e.g., target partition 101) and a uniform partition (e.g., uniform partition 105). For example, in some aspects, these partitions may be combination partitions. As described below in greater detail, combination partitions may comprise the union of a target partition (e.g., target partition 101) and a uniform partition (e.g., uniform partition 105). For example, a combination partition for the continuously valued numeric variable shown in FIG. 1 may comprise the union of target partition 101 and uniform partition 105.

Analysis information may comprise data and/or instructions stored in a non-transitory memory, consistent with disclosed embodiments. In some embodiments, analysis information may comprise one or more of a mapping function, a reduction function, target partitions (e.g., target partition 101), uniform partitions (e.g., uniform partitions 105) and statistical measures (e.g., statistical measures 103). In some aspects, the mapping function may implement the target partition. In certain aspects, the mapping function may implement the calculation partition. In various aspects, the mapping function may comprise data and/or instructions stored in a non-transitory memory. In certain aspects, the reduction function may specify operations to be performed on one or more variables of the data elements. These operations may include aggregating groups of values. As an non-limiting example, a reduction function may configure dataset processing system 200 to sum a number of financial services accounts and average the values of these accounts, and a mapping function may configure dataset processing system 200 to generate these sums and averages by, as non-limiting examples, an account holder state of residence, a delinquency status of the account, and decade of account holder age.

Figure 2:
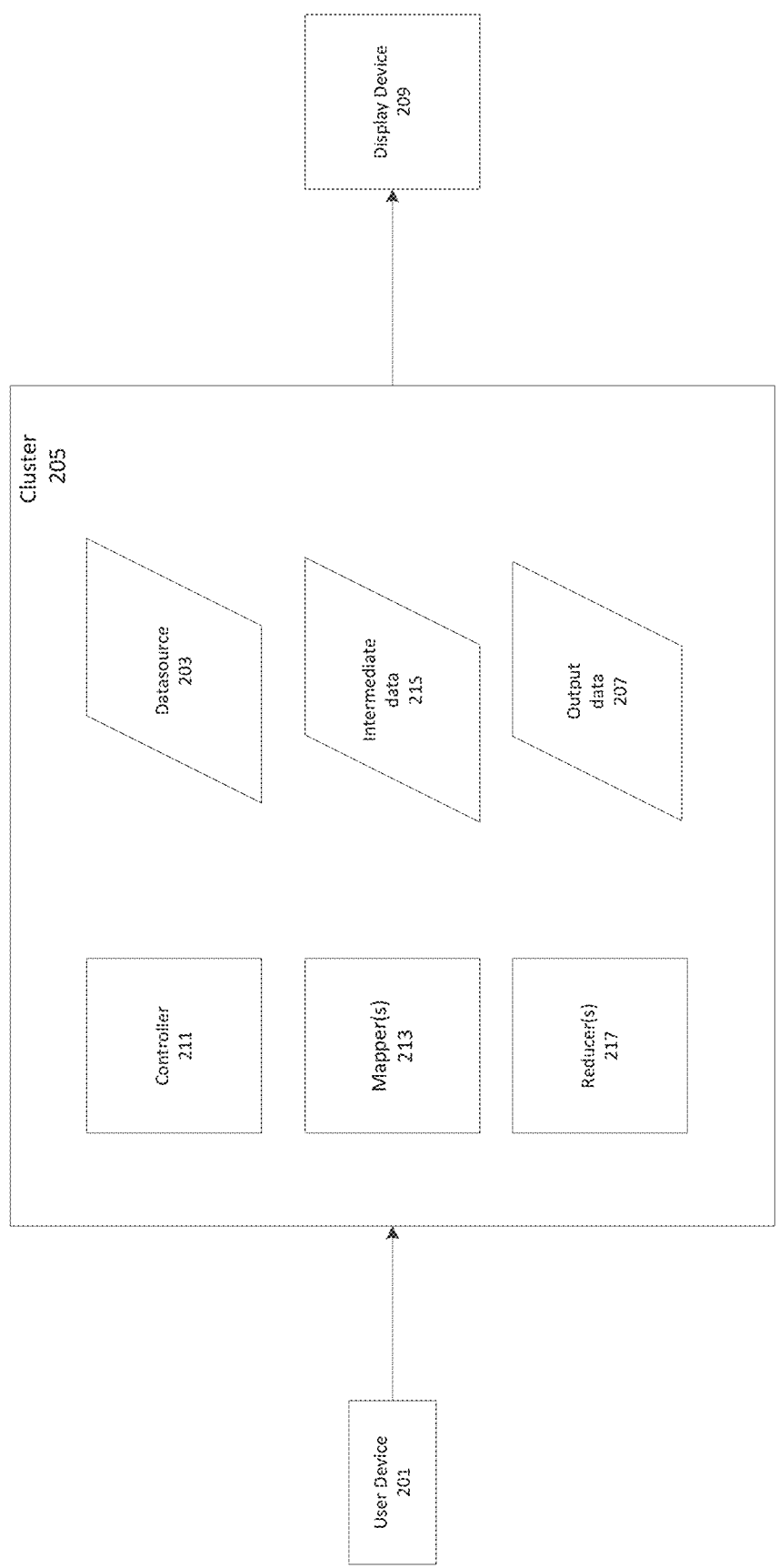
FIG. 2 depicts a schematic illustrating an exemplary system for parallel processing datasets with dynamic skew compensation.

FIG. 2 depicts a schematic illustrating an exemplary system (dataset processing system 200) for parallel processing datasets with dynamic skew compensation, consistent with disclosed embodiments. In some embodiments, dataset processing system 200 may be configured to impose a maximum group size by generating a calculation partition combining a uniform partition (e.g., uniform partition 105) with a target partition (e.g., target partition 101). Dataset processing system 200 may be configured to process data elements according to this calculation partition, and further process these secondary values to return analysis results aggregated into the target ranges of the target partition (e.g., target partition 101).

Dataset processing system 200 may comprise one or more of user device 201, datasource 203, cluster 205, and display device 209, consistent with disclosed embodiments. In certain aspects, cluster 205 may be configured to generate output data 207 using data elements received from datasource 203 according to analysis information provided by user device 201. Display device 209 may be configured to receive output data 207 and display analysis results according to the analysis information provided by user device 201. In various aspects, user device 201, datasource 203, cluster 205, and display device 209 may communicate over a network. In some aspects, the network may be any type of network (including infrastructure) that provides communications, exchanges information, and/or facilitates the exchange of information between the nodes. As a non-limiting example, the network may comprise a Local Area Network.

User device 201 may be configured to provide analysis information to other components of dataset processing system 200, consistent with disclosed embodiments. User device 201 may include, but is not limited to, a general purpose computer, computer cluster, terminal, mainframe, mobile computing device, or other computing device capable of providing analysis information to other components of dataset processing system 200. For example, a general purpose computer may include, but is not limited to, a desktop, workstation, or all-in-one system. As an additional example, a mobile computing device may include, but is not limited to, a cell phone, smart phone, personal digital assistant, tablet, or laptop. In some embodiments, user device 201 may be a client device of another component of dataset processing system 200. A non-limiting example of such a computing device is provided below in FIG. 6. In some aspects, a user (not shown) may operate user device 201, or direct operation of user device 201.

User device 201 may be configured to generate the uniform partition based on statistical measures (e.g., statistical measures 103), consistent with disclosed embodiments. In certain aspects, user device 201 may be configured to receive these statistical measures from another component of dataset processing system 200.

User device 201 may be configured to assign tasks to cluster 205. For example, user device 201 may be configured to assign mapping and/or reducing tasks to cluster 205. In some aspects, user device 201 may be configured to assign tasks to cluster 205 directly, by assigning tasks to worker nodes of cluster 205. In certain aspects, user device 201 may be configured to assign tasks to cluster 205 indirectly, by interacting with controller 211, as described below.

Datasource 203 may be configured to provide information to components of dataset processing system 200, consistent with disclosed embodiments. For example, datasource 203 may comprise a network socket. As a further example, datasource 203 may comprise a source of messages in a publication and subscription framework (e.g., Apache™ Kafka (see http://kafka.apache.org/)). Components of dataset processing system 200 may be configured to receive data elements through the network socket, or from the message source. As an additional example, datasource 203 may comprise a data stream, such as computer network traffic, financial transactions, or sensor data. In further examples the datasource may comprise data produced by another computing device, such as a computing cluster.

In some embodiments, datasource 203 may comprise a storage device that stores information for access and management by components of dataset processing system 200. In some aspects, the storage device may be implemented in a non-transitory memory, such as one or more memory buffers, a solid state memory, an optical disk memory, or a magnetic disk memory. In various aspects, cluster 205 may implement the storage device. In some aspects, the storage device may comprise a distributed data storage system, such as Apache™ HDFS™ (Hadoop® Distributed File System, see https://hadoop.apache.org/docs/r1.2.1/hdfs_design.html), Apache™ Cassandra™ (see http://cassandra.apache.org/), Apache™ HBase™ (Hadoop® Database, see https://hbase.apache.org/), or Amazon™ S3 (Amazon™ Simple Storage Service, see https://aws.amazon.com/s3/) As shown in FIG. 2, cluster 205 may comprise datasource 203. Alternatively, datasource 203 may be distinct from cluster 205 (not shown), and cluster 205 and datasource 203 may be connected by a network, as described above.

In some embodiments, datasource 203 may be implemented as a hierarchical database, relational database, object-oriented database, document-oriented database, graph-oriented database, key-value database, or any combination thereof. One of skill in the art would recognize many suitable implementations of datasource 203, and the envisioned embodiments are not intended to be limited to a particular implementation. Datasource 203 may be configured to provide data elements to cluster 205, consistent with disclosed embodiments. In some aspects, datasource 203 may provide data elements to cluster 205 in response to an indication from one or more of cluster 205 and user device 201.

In some embodiments, cluster 205 may comprise a collection of nodes connected over a network. In some aspects, the nodes may comprise computing devices, such as servers, workstations, desktops, graphics cards, videogame systems, embedded systems, etc. A non-limiting example of such a computing device is provided below in FIG. 6. In certain aspects, the network may be any type of network (including infrastructure) that provides communications, exchanges information, and/or facilitates the exchange of information between the nodes. As a non-limiting example, the network may comprise a Local Area Network. In certain embodiments, one or more nodes may comprise virtual nodes. In some embodiments, cluster 205 may exceed 100 nodes.

In some embodiments, cluster 205 may include a workstation comprising nodes. In certain aspects, the workstation may comprise multiple graphics processing units. The nodes may comprise the graphics processing units, or components of the graphics processing units, such as cores. The workstation may comprise non-transitory individual memories for the graphics processing units. As a non-limiting example, each graphics processing unit may use an individual memory. In this non-limiting example, the graphics processing units may not be configured to share the individual memories.

Cluster 205 may comprise one or more nodes configured as a worker node, consistent with disclosed embodiments. In various aspects, cluster 205 may be configured to assign resources to worker nodes. As a non-limiting example, cluster 205 may assign to worker nodes memory resources, such as a total amount of memory, or physical or virtual memory locations, or other memory resources as would be known by one of skill in the art. As another non-limiting example, cluster 205 may assign to worker nodes processor resources, such as cores, threads, physical or virtual processors, or other processor resources as would be known by one of skill in the art.

Cluster 205 may be configured to assign a number of worker nodes as mapper(s) 213 and/or reducer(s) 217, as discussed in greater detail below, consistent with disclosed embodiments. In some embodiments, cluster 205 may comprise a controller, such as controller 211, that configures worker nodes with mapping or reduction tasks. In various aspects, cluster 205 may determine the number of worker nodes assigned as mapper(s) 213. In some aspects, the number of number of worker nodes assigned as mapper(s) 213 and/or reducer(s) 217 may be determined manually or at least in part automatically. In certain aspects, the resources assigned to mapper(s) 213 and/or reducer(s) 217 may be determined manually or at least in part automatically. In some aspects, cluster 205 may be configured to temporarily or dynamically assign worker nodes as mapper(s) 213 and/or reducer(s) 217.

Consistent with disclosed embodiments, as described below with regard to FIG. 4, cluster 205 may be configured to process data elements according to analysis information received from user device 201. Cluster 205 may be configured to store the received analysis information as data and/or instructions in a non-transitory memory. In some embodiments, analysis information may comprise a mapping function implementing a calculation partition. Cluster 205 may be configured to process data elements according to the calculation partition. In certain embodiments, analysis information may comprise a mapping function implementing a target partition. Cluster 205 may be configured to augment the received mapping function to implement a calculation partition based on the received analysis information. Depending on the received analysis information, augmenting the mapping function may comprise determining one or more of the calculation partition, a uniform partition, and statistical measures for one or more variables. For example, cluster 205 may be configured to determine the calculation partition based on the received target partition. As an additional example, cluster 205 may be configured to determine the calculation partition based on a received uniform partition. As an additional example, cluster 205 may be configured to derive a uniform partition based on the received analysis information. For example cluster 205 may be configured to determine the uniform partition based on received statistical measures. As a further example, cluster 205 may be configured to determine statistical measures based on data elements received from datasource 203. In various embodiments, cluster 205 may be configured to receive a mapping function implementing the calculation partition.

In certain embodiments, cluster 205 may be configured to receive from user device 201 a reduction function for processing groups of values. The reduction function may be used to compute and extract certain features of the received data. As a non-limiting example, the reduction function may sum a number of financial services accounts and average the values of these accounts. Other examples include calculating the median or finding the top 10 values of any numeric field, such as financial services account balances. Other operations are possible as well. The received reduction function may comprise data and/or instructions stored in a non-transitory memory. Cluster 205 may be configured to generate output data 207 using the reduction function.

Output data 207 may comprise data or instructions derived from data elements, consistent with disclosed embodiments. In some embodiments, output data 207 may be stored in at least one non-transitory memory. For example, output data 207 may be stored in one or more memory buffers, a solid state memory, an optical disk memory, or a magnetic disk memory. In various aspects, one or more of cluster 205, user device 201, and/or display device 209 may be configured to store output data 207. In certain aspects, output data 207 may be stored on one or more remote non-transitory memories, according to systems known to one of skill in the art. In some aspects, output data 207 may be stored using a distributed storage system, such as Apache™ HDFS™, Apache™ Cassandra™, Apache™ HBase™, or Amazon™ S3. As would be recognized by one of skill in the art, the particular storage location of output data 207 is not intended to be limiting. In some embodiments, output data 207 may be streamed from a network socket, or provided as messages in a publication and subscription framework.

Output data 207 may include one or more key-value pairs, as described in greater detail below with regard to FIG. 4, consistent with disclosed embodiments. In some aspects, the key may correspond to a subset of a calculation partition. In various aspects, the key may correspond to a subset of the product of one or more target partitions and one or more categorical variable(s). In certain aspects, the value may be the result of performing an aggregation function on one or more values associated with the key. Output data 207 may be formatted as streamed data elements, text files, database files, or other data formats known to one of skill in the art. One of skill in the art would recognize many suitable formats for output data 207, and the envisioned embodiments are not intended to be limited to a particular format.

Display device 209 may be configured to receive data and/or instructions from other components of dataset processing system 200, consistent with disclosed embodiments. In some aspects, display device 209 may be configured to retrieve or receive output data 207. For example, display device 209 may be configured to retrieve output data 207 from a component of dataset processing system 200, such as cluster 205, datasource 203, user device 201, and/or one or more remote non-transitory memories. In various aspects, display device 209 may be configured to receive output data 207 streamed from a network socket, or provided as messages in a publication and subscription framework. In some embodiments, display device 209 may be configured to re-apply the reduction function, or another function, to output data 207 to generate analysis results, as described in detail below.

Display device 209 may be configured to provide analysis results. Providing analysis results may comprise displaying the analysis results, printing the analysis results, or storing them on a non-transitory computer readable medium. As would be recognized by one of skill in the art, the particular method of providing the analysis results is not intended to be limiting.

Display device 209 may include, but is not limited to, a general purpose computer, computer cluster, terminal, mainframe, or mobile computing device capable of receiving and displaying data and/or instructions. For example, a general purpose computer may include, but is not limited to, a desktop, workstation, or all-in-one system. As an additional example, a mobile computing device may include, but is not limited to, a cell phone, smart phone, personal digital assistant, tablet, or laptop. In some embodiments, display device 209 may be a client device of another component of dataset processing system 200. In certain embodiments, display device 209 and user device 201 may be the same device. In some embodiments, a user (not shown) may operate display device 209, or direct operation of display device 209.

Controller 211 may comprise one or more nodes of cluster 205 configured with data and instructions for managing the operations of dataset processing system 200, consistent with disclosed embodiments. In some embodiments, controller 211 may be configured to assign nodes of cluster 205 as worker nodes. In certain embodiments, controller 211 may be configured to assign worker nodes as mapper(s) 213. As an additional example, controller 211 may be configured to assign worker nodes as reducer(s) 217. In some embodiments, controller 211 may also be configured to track the status of mapper(s) 213 and reducer(s) 217, assigning and reassigning tasks (such as mapping and reduction) to worker nodes. In some embodiments, controller 211 may be configured to provide a mapping function to mapper(s) 213 and/or a reduction function to reducer(s) 217. In some embodiments, controller 211 may be configured to enable reducer(s) 217 to access intermediate data 215. For example, controller 211 may be configured to store locations of intermediate data 215, and provide these locations to reducer(s) 217. In certain embodiments, controller 211 may be configured to shuffle, or route, intermediate data from mapper(s) 213 to reducer(s) 217.

Mapper(s) 213 may comprise one or more nodes of cluster 205 configured with data and instructions for processing data elements. Consistent with disclosed embodiments, mapper(s) 213 may be configured to receive data elements and yield processed data elements according to a mapping function. As a non-limiting example, a data element may be associated with a key value according to the mapping function. A mapper processing a data element according to the mapping function may receive the data element and yield a processed data element. In some embodiments, the processed data element may comprise the key value. For example, a mapper processing words according to a mapping function that maps words to the number of letters in the word may receive the sentence "Midway on our life's journey, I found myself in dark woods, the right road lost" and yield {6, 2, 3, 5, 7, 1, 5, 6, 2, 4, 5, 3, 5, 4, 4}. In some embodiments, the processed data element may comprise the key-value together with at least a portion of the received data element. For example, a mapper processing {age, account balance} tuples according to a mapping function that maps ages to decades may receive the data elements {{35, $200}, {23, $1,000}, {54, $20,000}} and yield {{3, $200}, {2, $1,000}, {5, $20,000}}. In some embodiments, the processed data element may comprise the key-value together with a function of the received data element. In some embodiments, the mapping function may be received from controller 211. In certain embodiments, mapper(s) 213 may be configured to receive data elements from datasource 203. In some embodiments, mapper(s) 213 may generate intermediate data 215. In certain aspects, each of mapper(s) 213 may correspond to a portion of intermediate data 215.

Intermediate data 215 may comprise processed data elements generated by mapper(s) 213, consistent with disclosed embodiments. Intermediate data 215 may be stored in at least one non-transitory memory. For example, intermediate data 215 may be stored in one or more memory buffers, a solid state memory, an optical disk memory, or a magnetic disk memory. In various aspects, one or more of cluster 205, user device 201, and/or display device 209 may be configured to store intermediate data 215. In certain aspects, intermediate data 215 may be stored on one or more remote non-transitory memories, according to systems known to one of skill in the art. In some aspects, intermediate data 215 may be stored using a distributed storage system, such as Apache™ HDFS™, Apache™ Cassandra™, Apache™ HBase™, or Amazon™ S3. As would be recognized by one of skill in the art, the particular storage location of intermediate data 215 is not intended to be limiting.

In certain embodiments, as described in greater detail below with regard to FIG. 4, intermediate data 215 may be associated with a calculation partition. In certain aspects, each of intermediate data 215 may include one or more key-value pairs. In some aspects, the key may correspond to a subset of a calculation partition. In various aspects, the key may correspond to a subset of the product of one or more target partitions, and/or one or more categorical variable(s). In certain aspects, the value may be derived from a data element. As a non-limiting example, when the data element is a row of a relational database, the value may comprise one or more entries in the row. As a further non-limiting example, when the data element is a document, the value may comprise a token parsed from the document. One of skill in the art would recognize many suitable formats for intermediate data 215, and the envisioned embodiments are not intended to be limited to a particular format.

Reducer(s) 217 may comprise one or more nodes of cluster 205 configured with data and instructions for processing intermediate data 215. In some embodiments, controller 211 may configure reducer(s) 217 to retrieve stored intermediate data 215. In certain embodiments, controller 211 may be configured to shuffle, or route, intermediate data 215 to reducer(s) 217.

In some embodiments, reducer(s) 217 may be configured to derive secondary values and/or analysis results based on received analysis information. For example, reducer(s) 217 may be configured to generate groups of intermediate data 215 from corresponding subsets of a calculation partition. In certain aspects, each group may be generated by one of reducer(s) 217. In various aspects, reducer(s) 217 may configured to apply a reduction function to each group of intermediate data to generate secondary values. In some aspects, each secondary value may be generated by one of reducer(s) 217 and associated with a subset of the calculation partition. In some embodiments, output data 207 may comprise the secondary values.

As an additional example, reducer(s) 217 may be configured to generate groups of secondary values corresponding to subsets of a target partition. In certain aspects, reducer(s) 217 may be configured to apply a function to each group of secondary values to generate analysis results. For example, reducer(s) 217 may be configured to re-apply the reduction function, or another function. In some aspects, each analysis result may be generated by one of reducer(s) 217 and associated with a subset of the target partition. In some embodiments, output data 207 may comprise the analysis results.

Figure 3A:
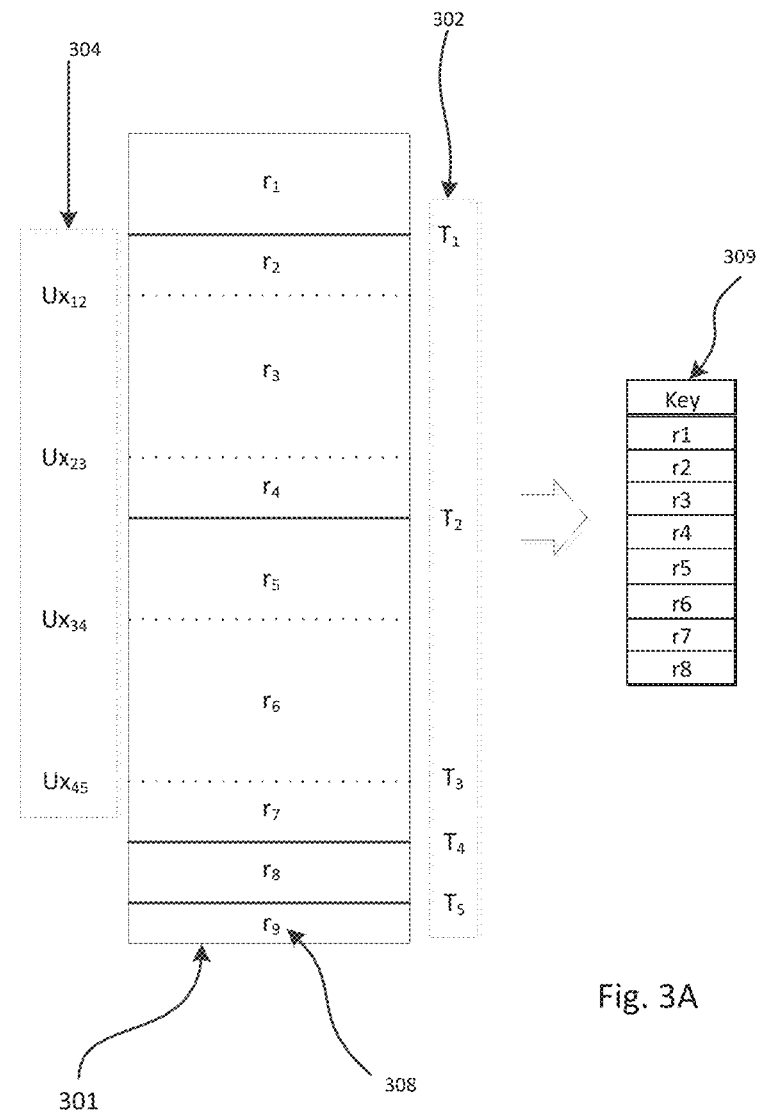
Figure 3B:
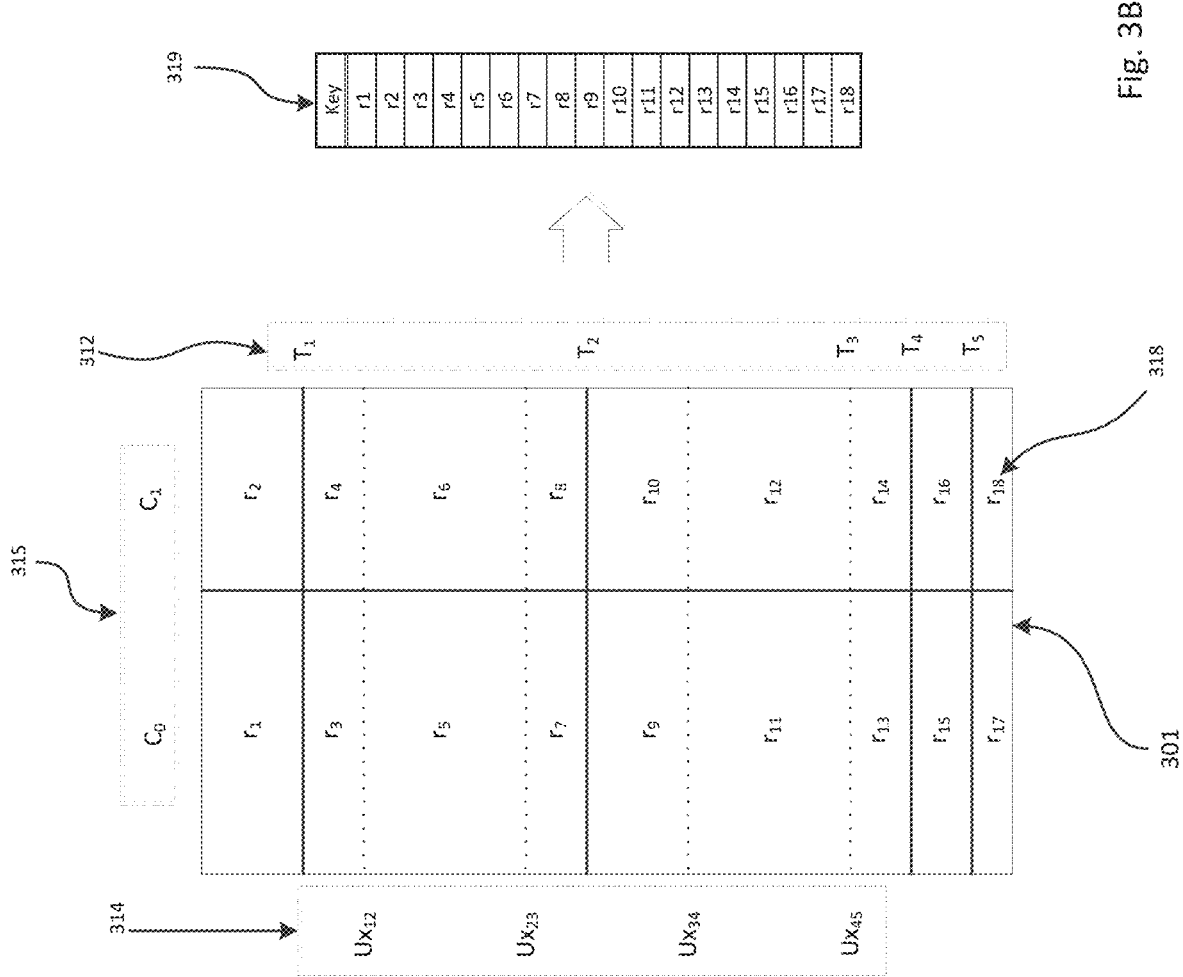

FIGS. 3A-3C depict schematics illustrating exemplary calculation partitions. Dataset 301, as depicted in each of FIGS. 3A-3C, graphically indicates the set of data elements received from datasource 203. FIG. 3A depicts a schematic illustrating an exemplary calculation partition comprising a combination partition for a numeric variable. This combination partition comprises the union of target partition 302 and uniform partition 304. In some embodiments, target partition 302 may comprise data or instructions for dividing dataset 301 into subsets. In certain aspects, these subsets may be defined by boundary values (e.g., $T_1$, $T_2$, $T_3$, $T_4$, and $T_5$). In various embodiments, uniform partition 304 may comprise data or instructions for dividing dataset 301 into subsets containing similar numbers of data elements. In certain aspects, these subsets may be defined by boundary values (e.g., $Ux_{12}$, $Ux_{23}$, $Ux_{34}$, and $Ux_{45}$). The boundary values of uniform partition 304 may depend on statistical measures (e.g., statistical measure 103). In some aspects, target partition 302 and uniform partition 304 may contain subsets with common boundary values (e.g., $Ux_{45}$ may equal $T_3$).

Consistent with disclosed embodiments, the boundary values of the combination partition may be the union of the boundary values of target partition 302 and uniform partition 304 (e.g., $T_1$, $Ux_{12}$, $Ux_{23}$, $T_2$, $Ux_{34}$, $T_3$, $T_4$, $T_5$ or equivalently $T_1$, $Ux_{12}$, $Ux_{23}$, $T_2$, $Ux_{34}$, $Ux_{45}$, $T_4$, $T_5$). In certain aspects, the calculation partition may divide the set of data elements received from datasource 203 into subsets 308 (e.g., $r_9$). In some embodiments, the mapping function may define keys 309 associated with each of subsets 308. In certain embodiments, a mapping function implementing the calculation partition may be arranged to configure mapper(s) 213 to yield intermediate data 215 comprising keys 309 according to a mapping function implementing the calculation partition.

FIG. 3B depicts a schematic illustrating an exemplary calculation partition comprising two partitions, a combination partition for a numeric variable and a categorical partition. The combination partition for a numeric variable comprises the union of target partition 312 and uniform partition 314. As discussed above with regards to FIG. 3A, uniform partition 314 of the first numeric variable may comprise data or instructions for dividing dataset 301 into value ranges containing similar numbers of data elements. Likewise, target partition 312 of the first numeric variable may comprise data or instructions for dividing dataset 301 into target ranges. Consistent with disclosed embodiments, the boundary values of the combination partition may be the union of the boundary values of target partition 312 and uniform partition 314 (e.g., $T_1$, $Ux_{12}$, $Ux_{23}$, $T_2$, $Ux_{34}$, $T_3$, $T_4$, $T_5$ or equivalently $T_1$, $Ux_{12}$, $Ux_{23}$, $T_2$, $Ux_{34}$, $Ux_{45}$, $T_4$, $T_5$). The partition for a categorical variable, target partition 315, may comprise data or instructions for configuring dataset processing system 200 to divide and aggregate data elements according to the values of the categorical variable (e.g., $C_0$ and $C_1$) and/or groups of values of the categorical variable.

In certain aspects, the calculation partition may divide the set of data elements received from datasource 203 into subsets 318 (e.g., $r_{12}$). These subsets may correspond to the combinations of ranges, categorical values, or categorical groups defined by the combination partition for the numeric variable and the partition for the categorical variable (e.g., $r_{12}$ corresponds to the categorical variable $C_1$ and the numerical range defined by the boundary values $Ux_{34}$ and $T_3$). In some embodiments, the mapping function may define keys 319 associated with each of subsets 318. In certain embodiments, the keys may be based on values from a range of values related to size of the available cluster resources. In certain embodiments, a mapping function implementing the calculation partition may be arranged to configure mapper(s) 213 to yield intermediate data 215 comprising keys 319 according to a mapping function implementing the calculation partition.

In certain embodiments, cluster 205 may be configured to distribute at least one task among multiple workers. In certain aspects, the at least one task may be distributed among multiple workers by associating multiple keys with at least one of subsets 318. For example cluster 205 may be configured to create additional unique keys for one of subsets 318. In certain aspects, one or more of subsets 318 defined by a value of a categorical variable (e.g., $C_1$) may be associated with multiple keys. For example, the mapping function may define sets of three keys for each of subsets $r_3$, $r_6$, $r_9$, $r_{12}$, $r_{15}$, and $r_{18}$. As an additional example, mapper(s) 213 may be configured to yield an intermediate datum comprising one of the three keys for each data element in subset $r_3$, according to the mapping function. In some aspects, in this manner, the uniform partition may be based on a random or pseudorandom value. For example, mapper(s) 213 may be configured to generate a random or pseudorandom value. In some aspects, this generated value may comprise the particular key. In some aspects, mapper(s) 213 may be configured to choose the particular key in the intermediate datum based on this generated value. In certain aspects, in this manner, the uniform partition may be based on a range of values related to the size of the available cluster resources. In certain aspects, in this manner, the uniform partition may be based on a range of values selected to optimize system processing speed. This selection may be based on one or more of empirical trials, simulations, and theoretical modeling, according to methods known to one of skill in the art. The number of additional unique keys may be predetermined, or may be dynamically determined during processing of the data elements. The value of the additional unique keys in each set may be chosen to indicate membership of the set. For example, a first set of keys associated with a first subset may have key values {1-1, 1-2, 1-3} and a second set of keys associated with a second subset may have key values {2-1, 2-2, 2-3}. One of skill in the art would appreciate that a wide range of values may be used and the above examples are not intended to be limiting. In this manner, maximum group sizes may be established for subsets defined at least in part by categorical variables. For example, when the categorical variable "geographic region" includes the categories {"northwest" "southwest" "midwest" "central" "northeast" "southeast"}, the number of individuals in the northeast category may be far larger than the number of individuals in other categories. By associating multiple keys with subsets defined at least in part by the category "midwest" of the categorical variable "geographic region," more balanced maximum group sizes may be established. In some embodiments, the number of keys for a category of the categorical variable may be a function of the number of items in the category and the number of items in the smallest category of the categorical variable. For example, the number of keys may be the quotient of the number of items in the category divided by the number of items in the smallest category.

FIG. 3C depicts a schematic illustrating an exemplary calculation partition comprising two partitions, a first combination partition for a first numeric variable and a second combination partition for a second numeric variable. Both combination partitions comprise a union of target partitions and uniform partitions. As discussed above with regards to FIGS. 3A and 3B, uniform partition 324 of a first numeric variable may comprise data or instructions for dividing dataset 301 into value ranges containing similar numbers of data elements. Likewise, target partition 322 of the first numeric variable may comprise data or instructions for dividing dataset 301 into target ranges. Consistent with disclosed embodiments, the boundary values of the first combination partition may be the union of the boundary values of target partition 322 and uniform partition 324 (e.g., $Tx_1$, $Ux_{12}$, $Tx_2$, $Ux_{23}$, $Tx_3$).

Similarly, uniform partition 327 of a second numeric variable may comprise data or instructions for dividing dataset 301 into value ranges containing similar numbers of data elements. In some embodiments, target partition 325 of the second numeric variable may comprise data or instructions for dividing dataset 301 into target ranges. Consistent with disclosed embodiments, the boundary values of the first combination partition may be the union of the boundary values of target partition 325 and uniform partition 327 (e.g., $Uy_{12}$, $Ty_1$).

In certain embodiments, the calculation partition may divide the set of data elements received from datasource 203 into subsets 328 (e.g., $r_{17}$). These subsets may correspond to the combinations of ranges, categorical values, or categorical groups defined by the first and second combination partitions (e.g., $r_{17}$ corresponds to the numerical range defined by the boundary values $Uy_{12}$ and $Ty_1$ and the numerical range defined by the boundary value $Tx_3$). In some embodiments, the mapping function may define keys 329 associated with each of subsets 328. In certain embodiments, a mapping function implementing the calculation partition may be arranged to configure mapper(s) 213 to yield intermediate data 215 comprising keys 329 according to a mapping function implementing the calculation partition.

As would be recognized by one of skill in the art, the exemplary calculation partitions disclosed in FIGS. 3A-3C may be generalized to address additional numeric and/or categorical variables. As a further non-limiting example, an exemplary calculation partition may comprise three partitions: a first combination partition for a first numeric variable, a second combination partition for a second numeric variable, and a third partition for a categorical variable. Consistent with disclosed embodiments, such an exemplary calculation partition may divide the set of data elements received from datasource 203 into subsets. This division may be performed according to the operations described above with regards to FIGS. 3B and 3C. Accordingly, the systems and methods disclosed herein are not intended to be limited to the exemplary partitions of FIGS. 3A-3C.

Figure 4:
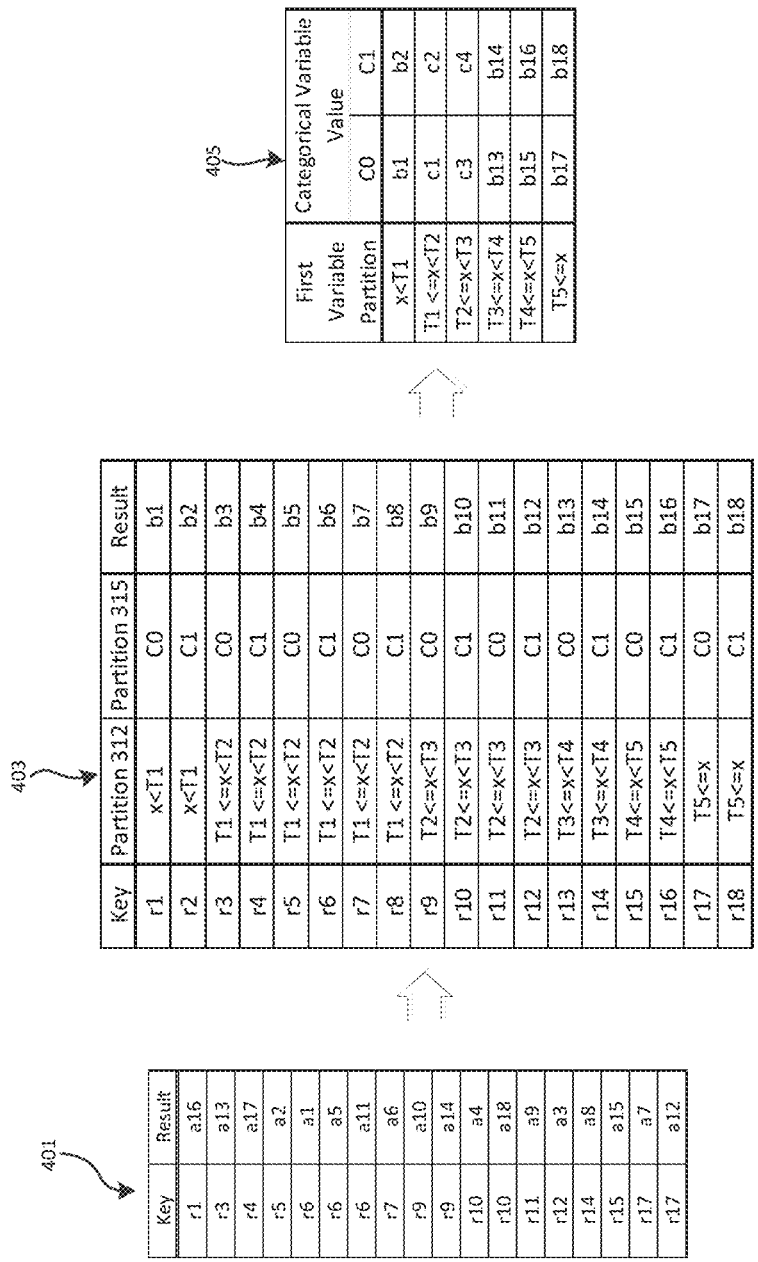
FIG. 4 depicts schematics illustrating exemplary datasets generated by a system for parallel processing datasets with dynamic skew compensation.

FIG. 4 depicts schematics illustrating exemplary datasets generated by a system for parallel processing datasets with dynamic skew compensation. In some embodiments, mapper(s) 213 may be configured to generate intermediate data 401. In certain embodiments, reducer(s) 217 may be configured to generate secondary values 403 from intermediate data 401. In certain aspects, reducer(s) 217 may be configured to store or stream secondary values 403 as output data 207. In certain embodiments, reducer(s) 217 may be configured to generate analysis results 405 from secondary values 403. In various aspects, reducer(s) 217 may be configured to store or stream analysis results 405 as output data 207. In some embodiments, display device 209 may be configured to generate analysis results 405 from secondary values 403.

Intermediate data 401 may contain processed data elements associating results with keys, consistent with disclosed embodiments. In some aspects, the keys may correspond to subsets of the calculation partition (e.g., one of keys 309, 319, or 329). A mapping function may define this association. In certain aspects, a result may comprise at least some of a data element. For example, when the data element is a row in a relational database, the result may comprise at least some of the elements of the row. In some aspects, the result may depend on the data element. In certain aspects, the result may depend on the mapping function. For example, the mapping function may configure mapper(s) 213 to perform trivially parallelizable calculations on data elements when generating intermediate data 401, as would be recognized by one of skill in the art.

Secondary values 403 may comprise keys associated with results, consistent with disclosed embodiments. In some aspects, the keys may be associated with corresponding subsets of the calculation partition (e.g., one of keys 309, 319, or 329), as described above with regards to FIGS. 3A-3C. In certain aspects, reducer(s) 217 may apply the reduction function to groups of intermediate data 401 associated with each key to generate secondary values 403.

Analysis results 405 may comprise entries associating results with subsets of one or more target partitions. In certain aspects, analysis results 405 may comprise entries for every combination of subsets of the one or more target partitions. As shown with respect to FIG. 3B and secondary values 403, multiple subsets of the calculation partition may correspond to a single subset of the target partition. For example, target partition 312 and target partition 315 together define a subset bounded by values $T_1$ and $T_2$ and the categorical value $C_0$. Subsets $r_3$, $r_5$, and $r_7$ of the calculation partition may correspond to this subset of the target partitions. One or more of reducer(s) 217 and display device 209 may apply a function to results $b_3$, $b_5$, and $b_7$ associated with $r_3$, $r_5$, and $r_7$ to generate a value $c_1$ for this subset of the target partitions. This function may be the reduction function, or another function. Values $c_2$, $c_3$, and $c_4$ of analysis results 405 may be similarly determined.

Figure 5:
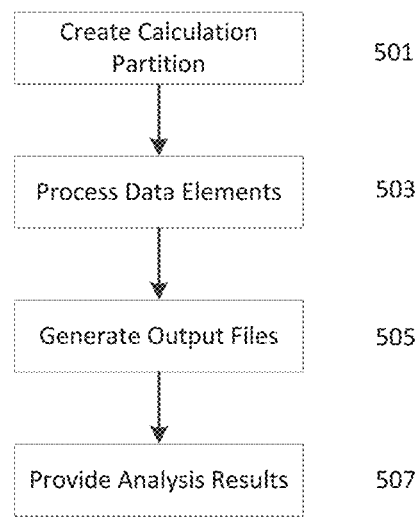
FIG. 5 depicts a flowchart illustrating exemplary operations for processing datasets with dynamic skew compensation.

FIG. 5 depicts a flowchart illustrating exemplary operations for processing datasets with dynamic skew compensation, consistent with disclosed embodiments. In step 501, the dataset processing system 200 may be configured to create a calculation partition. In some embodiments, the calculation partition may comprise one or more combination partitions. As described above, a combination partitions may comprise the union of a target partition (e.g., target partition 101) and a uniform partition (e.g., uniform partition 105). The uniform partition may be derived from statistical measures (e.g., statistical measures 103). The statistical measures may be quantiles.

User device 201 may be configured to create the calculation partition, consistent with disclosed embodiments. In certain aspects, user device 201 may be configured to receive indications of one or more target partitions. For example, user device 201 may be configured to receive indications of one or more target partitions from one or more of a user, a non-transitory memory, and a remote computer. In some aspects, user device 201 may be configured to receive indications of a mapping function and/or reduction function. For example, user device 201 may be configured to receive indications of at least one mapping function and/or at least one reduction function from one or more of a user, a non-transitory memory, and a remote computer. In some aspects, user device 201 may be configured to receive indications of one or more uniform partitions corresponding to the one or more target partitions. For example, user device 201 may be configured to receive the indications of uniform partitions from one or more of a user, a non-transitory memory, and a remote computer. In certain aspects, user device 201 may be configured to receive indications of one or more statistical measures corresponding to the desired target partitions. For example, user device 201 may be configured to receive indications of the one or more statistical measures from a user, a non-transitory memory, datasource 203, cluster 205, and a remote computer. Based on the received indications of the one or more statistical measures, user device 201 may be configured to generate one or more uniform partitions corresponding to the one or more desired target partitions.

Cluster 205 may be configured to create the calculation partition, consistent with disclosed embodiments. In some aspects, cluster 205 may be configured to receive analysis information from user device 201. Analysis information may comprise one or more of a mapping function, reduction function, target partitions, uniform partitions, and statistical measures. In some aspects, cluster 205 may be configured to determine one or more statistical measures from data elements received from datasource 203. In certain aspects, cluster 205 may be configured to determine one or more uniform partitions based on one or more received and/or determined statistical measures. In some aspects, cluster 205 may be configured to determine the calculation partition based on the one or more target partitions and the one or more received and/or determined uniform partitions. As described above, cluster 205 may comprise worker nodes. The worker nodes may be configured as mapper(s) 213 and reducer(s) 217. In some embodiments, controller 211 may configure mapper(s) 213 and reducer(s) 217. In certain embodiments, user device 201 may configure mapper(s) 213 and reducer(s) 217. In various embodiments, controller 211 may enable reducer(s) 217 to obtain intermediate data 215 generated by mapper(s) 213. In some embodiments, controller 211 may shuffle, or route, intermediate data 215 to reducer(s) 217.

Dataset processing system 200 may be configured to process data elements in step 503, consistent with disclosed embodiments. In some aspects, cluster 205 may be configured to process data elements received from datasource 203. For example, mapper(s) 213 may be configured to yield intermediate data 215 comprising keys according to the mapping function. In some aspects, controller 211 may be configured to provide a mapping function implementing the calculation partition to mapper(s) 213. In certain aspects, user device 201 may be configured to provide a mapping function implementing the calculation partition to mapper(s) 213.

Dataset processing system 200 may be configured to generate output data 207 in step 505, consistent with disclosed embodiments. In some aspects, cluster 205 may be configured to reduce intermediate data 215. For example, reducer(s) 217 may be configured to retrieve groups of intermediate data 215 corresponding to the keys. In some aspects, reducer(s) 217 may be configured to apply a reduction function to the groups of intermediate data 215 to generate secondary values. In some embodiments, cluster 205 may be configured to store or stream the secondary values as output data 207. In certain embodiments, reducer(s) 217 may be configured to apply the reduction function, or another function, to groups of secondary values to generate analysis results according to the one or more target partitions. In some aspects, cluster 205 may be configured to store or stream the analysis results as output data 207. As would be recognized by one of skill in the art, the disclosed embodiments may perform multiple iterations of grouping results and applying the reduction function, or another function, to generate the analysis results from the intermediate data 215.

Dataset processing system 200 may be configured to provide analysis results in step 505, consistent with disclosed embodiments. In some embodiments, display device 209 may be configured to retrieve or receive secondary values from output data 207. In certain aspects, display device 209 may be configured to apply a reduction function to groups of intermediate values to generate analysis results according to the one or more target partitions. In certain embodiments, display device 209 may be configured to retrieve or receive analysis results from output data 207. Display device 209 may be configured to provide analysis results, as described above with respect to FIG. 2. In certain embodiments, display device 209 and user device 201 may be the same device. In some embodiments, a user (not shown) may operate display device 209, or direct operation of display device 209.

Figure 6:
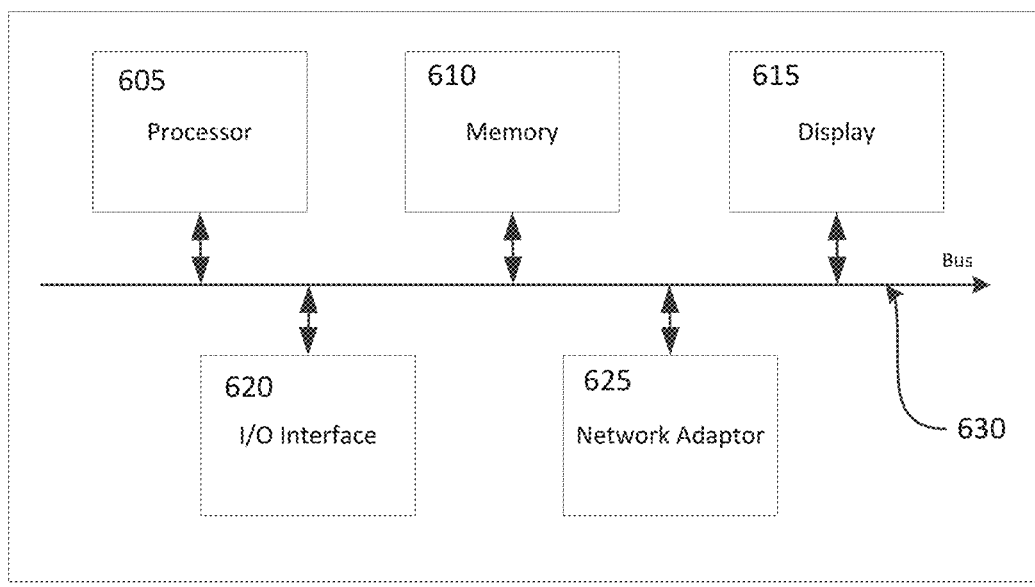
FIG. 6 depicts a schematic illustrating an exemplary component of a dataset processing system.

FIG. 6 depicts a schematic illustrating an exemplary component of dataset processing system 200, consistent with disclosed embodiments. In some embodiments, computing system 600 may include a processor 605, memory 610, and network adapter 625. In certain aspects, computing system 600 may include one or more of display 615 and I/O interface(s) 620. These units may communicate with each other via bus 630, or wirelessly, and may reside in a single device or multiple devices.

Consistent with disclosed embodiments, processor 605 may comprise one or more microprocessors, central processing units (CPUs), graphical processing units (GPUs), application specific integrated circuits (ASICs), or Field Programmable Gate Arrays (FPGAs). Memory 610 may include non-transitory memory containing non-transitory instructions, such as a computer hard disk, random access memory (RAM), removable storage, or remote computer storage. In some aspects, memory 610 may be configured to store software programs. In some aspects, processor 605 may be configured to execute non-transitory instructions and/or programs stored on memory 610 to configure computing system 600 to perform operations of the disclosed systems. In various aspects, as would be recognized by one of skill in the art, processor 605 may be configured to execute non-transitory instructions and/or programs stored on a remote memory to perform operations of the disclosed systems. Display 615 may be any device which provides a visual output, for example, a computer monitor, an LCD screen, etc. I/O interfaces 620 may include means for communicating information to computer system 600 from a user of computing system 600, such as a keyboard, mouse, trackball, audio input device, touch screen, infrared input interface, or similar device. Network adapter 625 may include components for enabling computing system 600 to exchange information with external networks. For example, network adapter 625 may include a wireless wide area network (WWAN) adapter, a Bluetooth® module, a near field communication module, or a local area network (LAN) adapter.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. As used herein, instructions may include, without limitation, software or computer code, as would be understood by one of skill in the art. The disclosed embodiments are not intended to be limited to instructions in a particular programming language or format. Accordingly, the disclosed embodiments are not limited to the above described examples, but are instead defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed operations of the disclosed systems for parallel processing of datasets with dynamic skew compensation can be modified in any manner, including by reordering, inserting, or deleting steps. Furthermore, these disclosed operations, considered as a sequence of steps, constitute methods for parallel processing of datasets with dynamic skew compensation. It is intended, therefore, that the specification and examples be considered as example only, with a true scope and spirit being indicated by the following claims and their full scope of equivalents.

What is claimed is:

1. A non-transitory computer readable medium storing a set of instructions that is executable by one or more processors of a controller in a cluster which further comprises a plurality of worker nodes, where the instructions cause the controller to perform a method comprising:

configuring at least one of the worker nodes as a mapper with a mapping function to process data elements received from a data source into intermediate data comprising a plurality of key-value pairs, where the mapping function implements:

a first combination partition configured to divide the data elements into a first set of groups determined by a union of a first target partition and a first uniform partition for a first variable of the data elements, wherein the first target partition divides the data elements into groups according to predetermined values or value ranges of the first variable, and the first uniform partition divides the data elements into similarly sized groups based on a statistical distribution of the values of the first variable, and a second combination partition configured to divide the data elements into a second set of groups determined by a union of a second target partition and a second uniform partition for a second variable of the data elements, wherein the second target partition divides the data elements into groups according to predetermined values or value ranges of the second variable, and the second uniform partition divides the data elements into similarly sized groups based on a statistical distribution of the values of the second variable, and where the mapping function defines a unique key for each intersection between the first set of groups and the second set of groups and each key in the key-value pairs of the intermediate data corresponds to one of the unique keys; and configuring a plurality of the worker nodes as reducers to process the intermediate data into output data for a display device or for subsequent processing, where each reducer processes the key value pairs corresponding to one or more of the unique keys and all of the key-value pairs which share the same unique key will be processed by exactly one reducer.

2. The non-transitory computer readable medium of claim 1, wherein the union combines the first target partition of the first variable and the first uniform partition of the first variable.

3. The non-transitory computer readable medium of claim 1, wherein the statistical distribution of the values of the first variable is determined using a plurality of statistical measures of the first variable values.

4. The non-transitory computer readable medium of claim 3, wherein the method further comprises determining the plurality of statistical measures.

5. The non-transitory computer readable medium of claim 3, wherein the statistical distribution of the first variable values is a probability distribution function of the first variable values.

6. The non-transitory computer readable medium of claim 3, wherein the first variable is a numeric variable and the plurality of statistical measures of the first variable values are either quantiles or estimated quantiles of the first variable values.

7. The non-transitory computer readable medium of claim 1, wherein the first uniform partition uses a random or pseudorandom value to divide the data elements into the similarly sized groups.

8. The non-transitory computer readable medium of claim 1, wherein the first uniform partition is based on a range of values selected to optimize system processing speed.

9. The non-transitory computer readable medium of claim 1, wherein the method further comprises receiving the predetermined values or value ranges of the first variable of the first target partition from a user device.

10. The non-transitory computer readable medium of claim 1, wherein the method further comprises determining the first uniform partition.

11. The non-transitory computer readable medium of claim 1, wherein the data elements comprise the first variable values.

12. A cluster for parallel processing of datasets with dynamic skew compensation, comprising:
at least one mapper worker node comprising a processor and a storage medium comprising instructions that, when executed by the processor, cause the mapper worker node to process data elements received from a data source into intermediate data comprising a plurality of key-value pairs using a mapping function;
a plurality of reducer worker nodes each comprising a processor and a storage medium comprising instructions that, when executed by the processor, cause the reducer worker node to process the intermediate data into output data for a display device or for subsequent processing, where each reducer processes the key-value pairs corresponding to one or more of the unique keys and all of the key-value pairs which share the same unique key will be processed by exactly one reducer; and
a controller comprising a processor and a storage medium comprising instructions that, when executed by the processor, cause the controller to configure the mapping function to implement:
a first combination partition configured to divide the data elements into a first set of groups determined by a union of a first target partition and a first uniform partition for a first variable of the data elements, wherein the first target partition divides the data elements into groups according to predetermined values or value ranges of the first variable, and the first uniform partition divides the data elements into similarly sized groups based on a statistical distribution of the values of the first variable, and
a second combination partition configured to divide the data elements into a second set of groups determined by a union of a second target partition and a second uniform partition for a second variable of the data elements, wherein the second target partition divides the data elements into groups according to predetermined values or value ranges of the second variable, and the second uniform partition divides the data elements into similarly sized groups based on a statistical distribution of the values of the second variable, and
wherein the configured mapping function defines a unique key for each intersection between the first set of groups and the second set of groups and each key in the key-value pairs of the intermediate data corresponds to one of the unique keys.

13. The cluster of claim 12, wherein the first uniform partition divides the data elements into similarly sized groups by establishing a maximum group size determined from the statistical distribution of the values of the first variable.

14. The cluster of claim 12, wherein the instructions of the controller further comprise instructions to determine a plurality of statistical measures of the first variable values and the statistical distribution of the values of the first variable is determined using the plurality of statistical measures.

15. The cluster of claim 14, wherein the statistical distribution of the first variable values is a probability distribution function of the first variable values.

16. The cluster of claim 12, wherein the predetermined values or value ranges of the first variable of the first target partition are received by the controller from a user device.

17. A system for parallel processing of datasets with dynamic skew compensation in a cluster comprising a plurality of worker nodes, comprising:
a controller comprising a processor and a non-transitory storage medium comprising instructions that, when executed by the processor, cause the controller to:
configure at least one of the worker nodes as a mapper with a mapping function to process data elements received from a data source into intermediate data comprising a plurality of key-value pairs, where the mapping function implements:
a first combination partition configured to divide the data elements into a first set of groups determined by a union of a first target partition and a first uniform partition for a first variable of the data elements, wherein the first target partition divides the data elements into groups according to predetermined values or value ranges of the first variable, and the first uniform partition divides the data elements into similarly sized groups based on a statistical distribution of the values of the first variable, and
a second combination partition configured to divide the data elements into a second set of groups determined by a union of a second target partition and a second uniform partition for a second variable of the data elements, wherein the second target partition divides the data elements into groups according to predetermined values or value ranges of the second variable, and the second uniform partition divides the data elements into similarly sized groups based on a statistical distribution of the values of the second variable, and where the mapping function defines a unique key for each intersection between the first set of groups and the second set of groups and each key in the key-value pairs of the intermediate data corresponds to one of the unique keys; and configure a plurality of the worker nodes as reducers to process the intermediate data into output data for a display device or for subsequent processing, where each reducer processes the key-value pairs corresponding to one or more of the unique keys and all of the key-value pairs which share the same unique key will be processed by exactly one reducer.

18. The system of claim 17, wherein the first uniform partition divides the data elements into similarly sized groups by establishing a maximum group size determined from the statistical distribution of the values of the first variable.

19. The system of claim 17, wherein the instructions of the controller further comprise instructions to determine a plurality of statistical measures of the first variable values and the statistical distribution of the values of the first variable is determined using the plurality of statistical measures.

20. The system of claim 17, further comprising a user device having a processor and a storage medium comprising instructions that, when executed by the processor, cause the user device to provide the predetermined values or value ranges of the first variable of the first target partition to the controller.

\* \* \* \* \*